United States Patent [19]
Huang

[11] Patent Number: 5,816,617
[45] Date of Patent: Oct. 6, 1998

[54] ADJUSTABLE MUD FLAP HOLDER

[75] Inventor: Nan Huang, Rancho Palos Verdes, Calif.

[73] Assignee: Grand General Accessories Manufacturing Inc., Compton, Calif.

[21] Appl. No.: 890,069

[22] Filed: Jul. 9, 1997

[51] Int. Cl.⁶ .................................................. F16M 13/60
[52] U.S. Cl. .......................... 280/851; 280/154; 280/848
[58] Field of Search .................................. 280/851, 848, 280/154; 248/340, 322, 500

[56] References Cited

U.S. PATENT DOCUMENTS

| D. 308,958 | 7/1990 | Knox . |
| 3,244,432 | 4/1966 | Ambli . |
| 3,473,825 | 10/1969 | Ochs . |
| 3,830,520 | 8/1974 | Kelly . |
| 3,877,722 | 4/1975 | Conner . |
| 4,572,532 | 2/1986 | Early et al. . |
| 5,050,908 | 9/1991 | Betts . |

FOREIGN PATENT DOCUMENTS 2269349  9/1994  United Kingdom .

*Primary Examiner*—D. Glenn Dayoan
*Assistant Examiner*—Clovia Hamilton
*Attorney, Agent, or Firm*—Thomas I. Rozsa; Tony D. Chen

[57] ABSTRACT

An adjustable mud flap holder which can be used as an anti-wrap device for a truck or trailer or the like wherein the mud flap is secured to the vehicle by a mounting member disposed along the upper edge thereof The mud flap holder has a pair of inverted U-shaped mounting supports which have their U-shaped upper ends formed for engaging the front side of the mud flap mounting member proximate the upper opposite ends of the mud flap. The mounting supports are formed to allow a horizontal cross-bar member to be slidably attached proximate the lower ends thereof at variable heights along the mounting supports and for permitting the upper ends of the mounting supports to be disposed at variable spacing from each other to fit different width mud flaps.

9 Claims, 2 Drawing Sheets

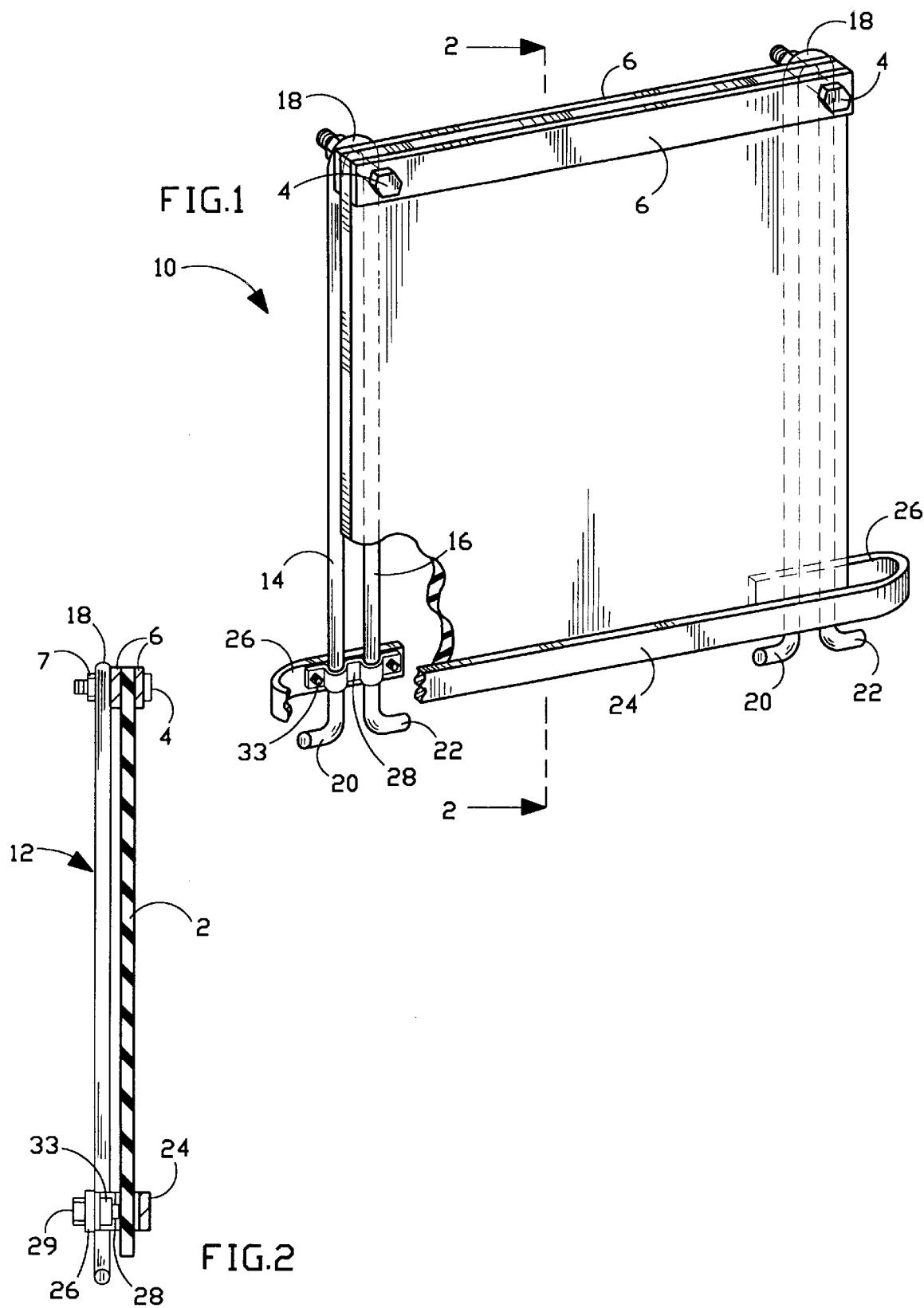

ADJUSTABLE MUD FLAP HOLDER

BACKGROUND OF THE INVENTION

1. Field of the Invention

The present invention generally relates to the field of anti-wrap devices for trucks or the like. More particularly, the present invention relates to the field of mud flap holders which prevent mud flaps mounted behind the wheels of a truck, trailer or the like from flapping due to wind and water or mud forces as the vehicle travels down the road.

2. Description of the Prior Art

Specifically, mud flaps are often used in vehicles, such as a truck, trailer or the like. The mud flaps prevent water, mud, and road debris, such as road stones and other solid objects, from being thrown into the front ends and windshields of vehicles. The mud flap is usually an elongated flexible piece of generally rectangular waterproof material which is disposed in a position behind the wheels or tires of a truck, trailer or the like. The mud flap is positioned so as to hang down behind the tires and intercept the water, mud, road stones, and other objects which might be thrown off of the truck or trailer tires in a rearward direction.

One characteristic of a mud flap is its tendency to flap or sail out of its effective operating position located behind a tire due to wind forces from passing traffic, and water and mud spray, and simply as a result of traveling on the road at high speed. To solve the above problem, one might increase the thickness or stiffness of the material, but this causes an increased manufacturing cost. Another answer which allows proper positioning of the mud flap is to support it with an anti-wrap device called a mud flap holder which limits the movement of the mud flap in response to these various forces while permitting the mud flap to be utilized while yet restraining its movement to the optimum location behind the tire.

The conventional mud flap holder usually is U-shaped containing two vertical sidebars and a lower horizontal bar which is fixedly connected to the lower ends of the two vertical bars. The upper ends of the vertical bars are attached to the mud flap hanger which is attached to the vehicle above the mud flap. The width between the two vertical sidebars of the mud flap holder is usually the same as the width of the mud flap and the lower horizontal bar of the mud flap holder is usually attached to the lower end of the mud flap for preventing the bottom part of the mud flap from bending, flapping or wrapping due to wind forces when the vehicle is traveling at high speeds.

The drawback with the conventional mud flap holder is that the lower horizontal bar is fixedly attached to the two vertical sidebars of the mud flap holder so that it can only fit one particular size of a mud flap. They are not adjustable to different sized mud flaps or for supporting the mud flaps at variable vertical locations along its length, and they are light, weight whereby they do not provide any resistant to flapping, they are generally unattractive, and they are of fixed configuration whereby they cannot be disassembled for packaging in, a small container for shipping.

The following eight (8) prior art patents are found to be pertinent to the field of the present invention:

1. U.S. Pat. No. 3,244,432 issued to Ambli on Apr. 5, 1966 for "Mud Flap Frame" (hereafter the "Ambli Patent");

2. U.S. Pat. No. 3,473,825 issued to Ochs on Oct. 21, 1969 for "Wheel Flap" (hereafter the "Ochs Patent");

3. U.S Pat. No. 3,830,520 issued to Kelly on Aug. 20, 1974 for "Combined Mud Flap And Stabilizer" (hereafter the "Kelly Patent");

4. U.S. Pat. No. 3,877,722 issued to Conner on Apr. 15, 1975 for "Mud Flap Apparatus For Trucks" (hereafter the "Conner Patent");

5. U.S. Pat. No. 4,572,532 issued to Early et al. on Feb. 25, 1986 for "Mud Flap Holder For Trucks" (hereafter the "Early Patent");

6. U.S. Pat. No. 5,050,908 issued to Betts on Sep. 24, 1991 for "Mud Flap Anti-Sail Bracket" (hereafter the "Betts Patent");

7. United Kingdom Patent No. 2,269,349 issued to Kay (hereafter the "Kay Patent"); and 8. U.S. Design Pat. No. 308,958 issued to Knox on Jul. 3, 1990 for "Vehicular Mudflap" (hereafter the "Knox Patent").

The Ambli Patent discloses a mud flap frame which is fixedly attached to the vehicle's body.

The Ochs Patent discloses a wheel flap. It comprises two opposite upper brackets fixedly attached to the bed of a truck, two opposite lower brackets adjustably attached to the two upper brackets by bolt means, and a cross bar attached to the upper and lower brackets by bolt means. Therefore, to adjust the cross bar, a user removes the bolt means and position the cross bar to line-up with apertures on the lower brackets and then reattaches the bolt means to the cross-bar and the lower brackets.

The Kelly Patent discloses a combined mud flap and stabilizer therefor used to prevent mud and stones from being thrown from the tires of the trucks into the path of other vehicles. The stabilizer is a flexible stranded steel cable having a U-shape and secured to the flap at its upper ends. The steel cable can be vertically adjusted on the flap to accommodate the flap for varying road conditions.

The Conner Patent discloses a mud flap apparatus for trucks. It comprises a reinforcing bar along the lower edge of the flap.

The Early Patent discloses a mud flap holder for trucks which does not have a lower horizontal beam that is adjustable.

The Betts Patent discloses a mud flap anti-sail bracket which is similar to your invention. It comprises a pair of depending spring steel support rods which are formed for engaging the front side of a mud flap by the mounting means at the upper corner. The mounting means secure the mud flap to the vehicle by a pair of clamping bars. The upper ends of the support rods are formed for engaging the front side of the mounting means which secure the mud flap to the vehicle. The upper ends of the support rods have eyes for inserting the bolts therethrough to secure the support rods to the vehicle structure or mounting bracket. The lower ends of the support rods are formed with a U-shaped lower end for permitting the shank of a securement bolt to pass between the two portions of the rod which are disposed in parallel relation. A flat bar stock steel cross-member is provided as a spacer which is secured between the lower ends of the support rods. The flat bar partially encircles the mud flap at the lower end of the mud flap. The flat bar is slidably attached to two support rods so that the height of the flat bar can be adjusted to a desired position by the user of the bracket. One of disadvantages with the Betts Patent is that the upper ends of the support rods are permanently fixed to the vehicle structure at only one vertical location and are not adjustable. Another disadvantage with the Betts' device is that the flat bar stock can only be adjusted to a certain vertical height, half the length of the support rods.

The Knox Patent discloses a vehicular mud-flap.

The Kay Patent discloses devices for controlling spray from vehicles. It comprises a lower deflector part which extends downward and rearward to intercept spray thrown up by the wheel. The deflector part has an upper upright extension.

It is highly desirable to have a very efficient and also very effective design and construction of a mud flap holder which can be adaptable to different sized mud flaps. It is desirable to provide a mud flap holder which allows positioning of the mud flap horizontal bar at variable vertical locations along the bottom end of the mud flap. It is also desirable to provide a mud flap holder which is constructed of a multiple of simple pieces which can be disassembled for packaging in the smallest possible container for shipping.

SUMMARY OF THE INVENTION

The present invention is an adjustable mud flap holder which can be used as an anti-wrap device for a truck, trailer or the like wherein the mud flap is secured to the vehicle by a mounting means disposed along the upper edge thereof. The mud flap holder comprises a pair of inverted U-shaped mounting supports which have their U-shaped upper ends formed for engaging the front side of the mud flap mounting means proximate the upper opposite ends of the mud flap. The mounting supports are formed to allow a horizontal cross-bar member to be slidably attached proximate the lower ends thereof at variable heights along the mounting supports and for permitting the upper ends of the mounting supports to be disposed at variable spacing from each other to fit different width mud flaps.

It is therefore an object of the present invention to provide a mud flap holder which is an anti-wrap device which prevents flapping or sail out of the mud flap due to wind and water forces and thrown mud as the vehicle is traveling on the road.

It is also an object of the present invention to provide a mud flap holder which is adjustable to different sized mud flaps and permits placement of the mud flap horizontal cross-bar member at variable heights along the bottom end of the mud flap.

It is an additional object of the present invention to provide a mud flap holder which has an aesthetically pleasing appearance.

It is a further object of the present invention to provide a mud flap holder which can be made from a plurality of simply made pieces which can be disassembled for packaging into the smallest possible container for shipping.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective view of the present invention mud flap holder;

FIG. 2 is a cross-sectional view taken along line 2—2 of FIG. 1;

DESCRIPTION OF THE PREFERRED EMBODIMENT

Figure 3:
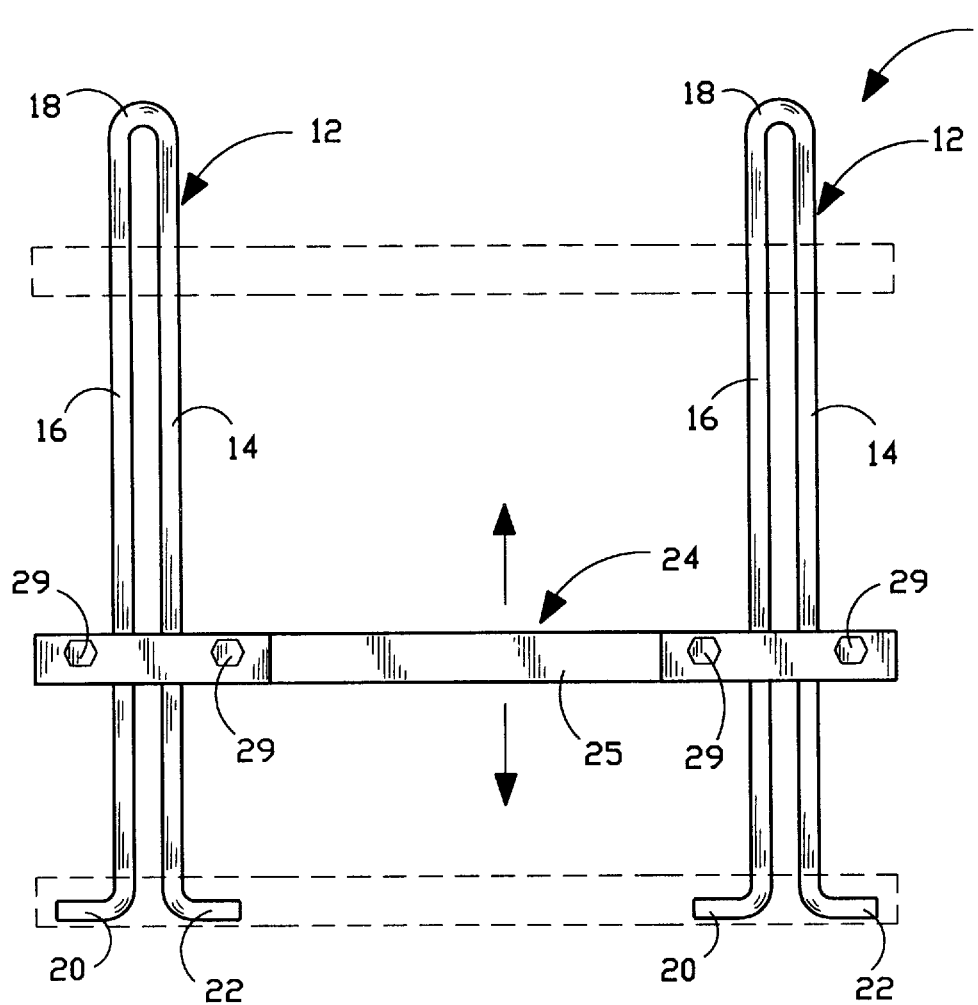
FIG. 3 is a front elevational view of the present invention mud flap holder.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIG. 1, there is shown at 10 an anti-wrap device called a mud flap holder of the present invention which is particularly adapted to a truck mud flap 2 which is secured to a vehicle (not shown) by a mounting means disposed along the upper edge of the mud flap 2 and at least partially clamping the mud flap 2 therein. The mud flap holder 10 can fairly retain large size mud flaps, such as sizes of 24" by 24" or 24" by 30" or 24" by 36".

The mud flap holder 10 comprises a pair elongated vertical and identical inverted U-shaped mounting supports 12. The mounting supports 12 are engaged with the front side of the mud flap 2 by the mounting means at the upper and opposite corners of the mud flap 2. The mounting means securing the mud flap 2 to the vehicle consists of a pair of horizontal flat clamping bars 6, which secure the mud flap 2 therebetween and are secured to the truck by at least two bolts 4 which pass therethrough a portion of the body structure of the vehicle and secured thereto by at least two nuts 7 or a mounting bracket projecting therefrom.

Referring to FIGS. 1, 2 and 3, the pair of mounting supports 12 are substantially identical, and to the extent they are, only one will be described in detail. Each mounting support 12 is formed with two adjacent and parallel side rods 14 and 16 having a closed inverted U-shaped upper end 18 and two outwardly curved lower ends 20 and 22. Each inverted U-shaped upper end 18 engages the front side of the mounting means which secures the mud flap 2 to the vehicle whereby the two adjacent and parallel rods 14 and 16 are disposed in front of the mud flap 2 and behind the wheels (not shown). The bolts 4 are long enough to be inserted between the adjacent and parallel rods 14 and 16 of the mounting supports 12, as well as the clamping bars 6 and the vehicle structure or mounting bracket. The bolts 4 are located adjacent to and abutting against the interior side of the U-shaped upper ends 18 of the mounting supports 12 respectively.

An elongated flat horizontal cross-bar member 24 is provided with the present invention mud flap holder 10. The cross-bar member 24 has a middle portion 25 and two opposite folded back free ends 26 for partially encircling the mud flap 2 in a spaced apart relation. The folded back ends 26 of the cross-bar member 24 are formed for respectively securing to the two pairs of parallel rods 14 and 16 of the mounting support 12 at variable heights along the length of the rods.

Figure 4:
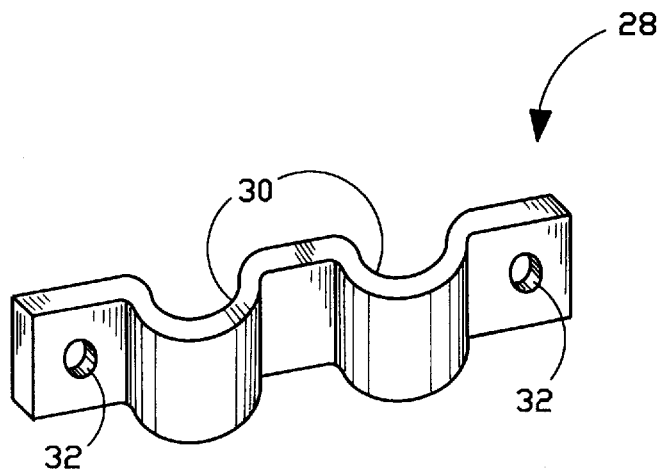
FIG. 4 is an enlarged perspective view of one of the two clamping means of the present invention mud flap holder, the other one being identical.

FIG. 4 shows one of two clamping members 28. Referring to FIGS. 1 and 4, the two clamping members 28 are substantially identical, and to the extent they are, only one will be described in detail. Each clamping member 28 is formed with two arch shaped recesses or humps 30 for respectively receiving two adjacent and parallel rods 14 and 16 of the mounting support 12. Each clamping member 28 also has two opposite apertures 32 which extend therethrough.

Each clamping member 28 is respectively attached to the folded back ends 26 of the horizontal cross-bar member 24 by bolts 29 which are inserted through the folded back ends 26 of the cross-bar member 24 and also inserted through the apertures 32 of the clamping member 28 and secured thereto by nuts 33. When the bolts 29 are tightened, the cross-bar member 24 and the clamping members 28 are secured to the rods 14 and 16. The folded back ends 26 of the cross-bar member 24 are spaced from the middle portion 25 of the cross-bar member 24 in parallel relation to provide a spacing which permits the mud flap 2 to be disposed therebetween in partially surrounded spaced relation thereto. The two outwardly curved lower ends 20 and 22 of each mounting support 12 prevent the horizontal cross-bar member 24 from sliding off the mounting supports . FIG. 3 shows dashed lines at the upper and lower locations of the two mounting supports 12, which represent the cross-bar member 24. The cross-bar member 24 can be slid into those locations as required by the user or any other location on the cross-bar member 24.

The operation of the foregoing embodiment now will be described. The mounting supports 12 of the mud flap holder 10 of the present invention are able to accommodate bending to permit the mud flap 2 to absorb unexpected forces and also permit the lower end of the mud flap 2 to move within certain limitations within the mud flap holder 10. The cross-bar member 24, when positioned correctly, prevents the mud flap 2 from flapping or sail out of its hanging position.

The present invention conforms to conventional forms of manufacture or any other conventional way known to one skilled in the art, and is of simple construction and is easy to use. By way of example, the mounting supports 12 and the cross-bar member can be made of steel material. In the preferred embodiment, the mud flap holder 10 is chrome-plated for an aesthetically pleasing appearance.

Defined in detail, the present invention is a mud flap holder for retaining a mud flap wherein the mud flap is secured to a vehicle by a mounting means disposed along an upper edge thereof, the mud flap holder comprising: (a) a pair of elongated identical vertical inverted U-shaped mounting supports, each mounting support having two adjacent and parallel rods extending downwardly from an inverted U-shaped upper end, and each having an outwardly curved lower end, each inverted U-shaped upper end being detachably secured to the mounting means proximate an upper edge of the mud flap; (b) an elongated flat horizontal cross-bar member having a middle portion and two opposite folded over back ends disposed parallel to the middle portion for partially encircling the mud flap in a spaced apart relation thereto proximate the outwardly curved lower ends of each the pair of mounting supports; (c) a pair of clamping members respectively abutting against the folded over back ends of the horizontal cross-bar member, each clamping member having two arch shaped recesses for respectively receiving the two adjacent and parallel rods of each the pair of mounting supports; and (d) two pairs of bolt members each pair respectively inserted through the folded over back ends of the cross-bar member and one of the pair of clamping members for clamping the two adjacent and parallel rods of each the pair of mounting supports, wherein the cross-bar member is adjustable thereof at different vertical positions along the pair of mounting supports.

Defined broadly, the present invention is a mud flap holder for retaining a mud flap wherein the mud flap is secured to a vehicle by a mounting means disposed along an upper edge thereof, the mud flap holder comprising: (a) a pair of inverted U-shaped mounting supports, each mounting support having two adjacent rods extending downwardly from an inverted U-shaped upper end, and each having an lower end, each inverted U-shaped upper end being detachably secured to the mounting means proximate an upper edge of the mud flap; (b) a flat cross-bar member having a middle portion and two opposite folded back ends disposed parallel to the middle portion for partially encircling the mud flap in a spaced apart relation thereto proximate the lower ends of each the pair of mounting supports; (c) a pair of clamping members respectively abutting against the folded back ends of the cross-bar member, each clamping member having two shaped recesses for respectively receiving the two adjacent rods of each the pair of mounting supports; and (d) means for adjustably clamping the two adjacent rods of each the pair of mounting supports, wherein the cross-bar member is adjustable thereof at different positions on the pair of mounting supports.

Defined more broadly, the present invention is an anti-wrap device for retaining a mud flap wherein the mud flap is secured to a vehicle by a mounting means disposed along an upper edge thereof, the device comprising: (a) two mounting supports, each mounting support having an upper end and a lower end, each upper end being detachably secured to the mounting means proximate an upper edge of the mud flap; (b) a cross-bar having two ends disposed parallel to a middle portion of the cross-bar for partially encircling the mud flap in a spaced apart relation; and (c) means for adjustably attaching the cross-bar to the two mounting supports and located adjacent to the lower ends, wherein the cross-bar is adjustable thereof at different positions on the two mounting supports.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A mud flap holder for retaining a mud flap wherein the mud flap is secured to a vehicle by a mounting means disposed along an upper edge thereof, the mud flap holder comprising:

a. a pair of inverted U-shaped mounting supports, each mounting support having two adjacent rods extending downwardly from an inverted U-shaped upper end, and each having an lower end, each inverted U-shaped upper end being detachably secured to said mounting means proximate an upper edge of said mud flap;

b. a flat cross-bar member having a middle portion and two opposite folded back ends disposed parallel to the middle portion for partially encircling said mud flap in a spaced apart relation thereto proximate said lower ends of each said pair of mounting supports. said lower ends of each said pair of mounting supports are generally outwardly curved to prevent said crossbar member from sliding off said pair of mounting support;

c. a pair of clamping members respectively abutting against said folded back ends of said cross-bar member, each clamping member having two shaped recesses for respectively receiving said two adjacent rods of each said pair of mounting supports; and d. means for adjustably clamping said two adjacent rods of each said pair of mounting supports, wherein said cross-bar member is adjustable thereof at different positions on said pair of mounting supports.

2. The mud flap holder in accordance with claim 1 wherein said cross-bar member has finished metal surfaces.

3. The mud flap holder in accordance with claim 1 wherein said mud flap holder is chrome-plated.

4. The mud flap holder in accordance with claim 5 wherein said means for adjustably clamping said two adjacent rods of each said pair of mounting supports include two pairs of bolt members, each pair respectively inserted through said folded back ends of said cross-bar member and one of said pair of clamping members and secured thereto by two pairs of nut members respectively.

5. An anti-wrap device for retaining a mud flap wherein the mud flap is secured to a vehicle by a mounting means disposed along an upper edge thereof, the device comprising:

a. two mounting supports, each mounting support having an upper end and a lower end, each upper end being detachably secured to said mounting means proximate an upper edge of said mud flap;

b. a cross-bar having two ends disposed parallel to a middle portion of the cross-bar for partially encircling said mud flap in a spaced apart relation;

c. said lower ends of each said two mounting supports has an outwardly curved end for preventing said cross-bar from sliding off said two mounting supports; and d. means for adjustably attaching said cross-bar to said two mounting supports and located adjacent to said lower ends, wherein said cross-bar is adjustable thereof at different positions on said two mounting supports.

6. The anti-wrap device in accordance with claim 5 wherein said cross-bar has finished metal surfaces.

7. The anti-wrap device in accordance with claim 5 wherein said device is chrome-plated.

8. The anti-wrap device in accordance with claim 5 wherein said upper ends of each said two mounting supports has a U-shaped upper end to allow a cross-bar securement means to be inserted therebetween at different positions along said two mounting supports.

9. The anti-wrap device in accordance with claim 5 wherein said means for adjustably attaching said cross-bar to said two mounting supports include a bolt member respectively inserted through said cross-bar and each said two mounting supports and secured thereto by a nut member.

* * * * *